United States Patent [19]

Kramer

[11] 4,078,016
[45] Mar. 7, 1978

[54] HALOGENATED AROMATIC POLYMER/METAL PHOSPHINATE POLYMER FLAME RETARDANT COMPOSITION

[75] Inventor: Charles E. Kramer, Florham Park, N.J.

[73] Assignee: Celanese Corporation, New York, N.Y.

[21] Appl. No.: 686,845

[22] Filed: May 17, 1976

[51] Int. Cl.$^2$ ............... C08L 67/00; C08L 69/00; C08L 75/04; C09K 3/28
[52] U.S. Cl. ............... 260/860; 260/45.7 P; 260/45.75 R; 260/857 R; 260/858
[58] Field of Search ............ 260/860, 45.75 R, 45.7 P, 260/857 R, 858

[56] References Cited

U.S. PATENT DOCUMENTS

| | | | |
|---|---|---|---|
| 3,014,949 | 12/1961 | Birum et al. | 260/971 |
| 3,014,953 | 12/1961 | Brium et al. | 260/970 |
| 3,574,164 | 4/1971 | Cyba | 260/45.75 R |
| 3,786,114 | 1/1974 | Jaquiss et al. | 260/860 |
| 3,787,360 | 1/1974 | Daigle et al. | 260/860 |
| 3,853,819 | 12/1974 | Herwig et al. | 260/75 P |
| 3,931,099 | 1/1976 | King | 260/860 |
| 3,932,351 | 1/1976 | King | 260/860 |

*Primary Examiner*—Allan Lieberman

[57] ABSTRACT

A composition having flame retardant properties is provided which comprises a blend of a synthetic aromatic polymer containing chlorine and bromine (as defined), with a linear metal phosphinate polymer (as defined), which composition may be dissolved by certain solvents to form a homogeneous solution readily adaptable to extrusion operations.

29 Claims, No Drawings

HALOGENATED AROMATIC POLYMER/METAL PHOSPHINATE POLYMER FLAME RETARDANT COMPOSITION

BACKGROUND OF THE INVENTION

The use of various materials incorporated into polymeric resins in order to improve the flame retardance thereof is known in the prior art. It is also known that the flame resistance of these polymers (e.g., polyesters) may be improved by including bound halogen therein. The bound halogen is included in the polymer (e.g., polyester) by use of halogen containing monomer or monomers used in the formation of the polymer. It is also known that the inclusion of phosphorus compounds or antimony compounds in these halogen containing polymers sometimes enhances the flame resistance of the product. Inorganic flame retardants such as antimony oxide ($Sb_2O_3$) may be characterized as having a low solubility in the more volatile and desirable polymer solvents such as methylene chloride, chloroform, and dioxane which may be utilized in wet or dry spinning. Accordingly such additives have been utilized in spinning, extruding and molding operations. However, the polymer dopes containing these inorganic additives which may be processed to form articles by extrusion often exist as a heterogeneous system comprising small solid particles of the inorganic flame retardant additives. These solid particles tend to clog the extrusion orifice thereby interfering with the efficiency of the extrusion operation.

It has been observed that while the techniques used to reduce the flammability of polymeric resins do so to some extent, most suffer from some drawback. Compounds containing the phosphinate group have been utilized in the prior art as flame retardant additives as illustrated by U.S. Pat. Nos. 3,014,949, 3,574, 164 and 3,014,953.

However, the metal salts of phosphonic acid salts which appear in U.S. Pat. No. 3,574,164 are ionic, and would therefore not be soluble in organic solvents. Further, those phosphorus compounds which are monomeric, such as found in all of the cited patents, would not be expected to show enhanced thermal stability and would likely impart a plasticizer effect to most polymer systems.

The poly metal phosphinates of the presently claimed invention are polymeric nonionic coordination compounds and are soluble in organic solvents.

It is therefore an object of the present invention to provide a method of enhancing the fire retardancy of halogenated aromatic polymers of the type described herein.

It is another object of the present invention to provide a novel flame retardant halogenated aromatic polymeric composition.

It is a further object of the present invention to provide a flame retardant halogenated aromatic polymeric composition of enhanced thermal stability.

It is another object of the present invention to provide a novel flame retardant halogenated aromatic polyester composition.

It is a further object of the present invention to provide a flame retardant halogenated aromatic polyester composition of enhanced thermal stability.

It is still a further object of the present invention to provide a flame retardant additive of enhanced solubility over other known inorganic flame retardant additives in solvents encountered in spinning, molding, and extrusion operations.

It is another object of the present invention to provide a polymeric inorganic flame retardant additive that is soluble in a polymer melt and compatible with melt extrusion processing.

These and other objects as well as the scope, nature and utilization of the invention will be apparent to those skilled in the art from the following description and appended claims.

SUMMARY OF THE INVENTION

In one aspect of the present invention there is provided a composition having flame retardant properties which comprises:

A composition having flame retardant properties comprising

A. a synthetic aromatic polymer containing chlorine, bromine, or mixtures thereof chemically bound to an aromatic ring and B. a linear polymeric metal phosphinate of the recurring structural formula selected from the group consisting of

  (I)

  (II)

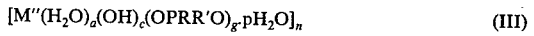  (III)

wherein R and R' may be the same or different and represent lower alkyl or aryl radicals, M is a metal selected from the group consisting of Co, Mn, Cr, Ni, Zn, Zr, Ti, and M' is a member selected from the group consisting of Ti and Zr; B is a member selected from the group consisting of oxo, alkoxy, aryloxy and z equals 1 when B equals oxo, z equals 2 when B equals alkoxy and aryloxy and z equals 0 when m equals 3; M" is Cr(III); $a+p = 1$; m may vary from 1 to 3, q may vary from 1 to 3, c may vary from 0 to 3, and n is at least 10

In another aspect of the present invention there is provided a process for preparing a composition having flame retardant properties which comprises A process for providing a composition having flame retardant properties comprising:
blending A. a halogenated aromatic polyester of the recurring structural formula

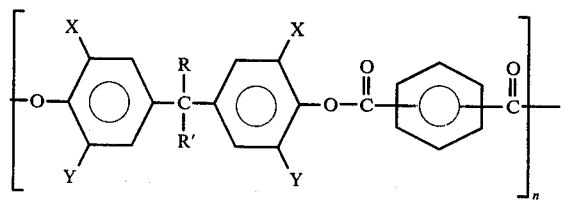

where X is chlorine or bromine, R and R' may be the same or different and represent lower alkyl groups, hydrogen, or together constitute a cyclic hydrocarbon group, n=at least 25, with said aromatic polyester being a product of a tetrabromobisphenol and a mixture of 45 to 75 percent by weight of isophthalic acid or the ester forming derivatives thereof and correspondingly about 55 to 25 percent by weight of terephthalic acid or the ester forming derivatives thereof when X = Br, and with said halogenated polymer being a product of a tetrachlorobisphenol, and a mixture of 90 to 40 percent by weight isophthalic acid or the ester forming derivatives thereof and correspondingly about 10 to 60 percent by weight terephthalic acid or ester forming derivatives thereof when X = Cl, with;

B. a polymeric metal phosphinate of the recurring structural formula selected from the group consisting of

[M(OPRR'O)$_m$]n    (I)

[M'(B)$_z$(OPRR'O)$_m$]n    (II)

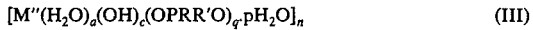

[M"(H$_2$O)$_a$(OH)$_c$(OPRR'O)$_q$·pH$_2$O]$_n$    (III)

wherein R and R' may be the same or different and represent lower alkyl or aryl radicals, M is a metal selected from the group consisting of Co, Mn, Cr, Ni, Zn, Zr, Ti, M' is a member selected from the group consisting of Ti and Zr; B is a member selected from the group consisting of oxo alkoxy, and aryloxy, z equals 1 when B equals oxo and z equals 2 when B equals alkoxy and aryloxy; z equals 0 when m equals 3; M" is Cr(III); a+p equals 1, m may vary from 1 to 3, q may vary from 1 to 3, c may vary from 0 to 3, and n is at least 10.

DESCRIPTION OF PREFERRED EMBODIMENTS

It has been found that metal phosphinate polymers of the type described herein may be used to impart acceptable levels of flame retardant to synthetic aromatic polymers containing chlorine, bromine, or mixtures thereof without deleteriously affecting other properties of the composition formed therefrom such as the ability to form a homogeneous solution when contacted with certain solvents.

When the metal phosphinate polymers of the type described herein were added to a non-halogenated polyester, such as, polyethylene terephthalate, no significant flame retardant effect was obtained.

Thus, the combination of the polymers of the subject invention unexpectedly demonstrates a synergistic flame retardant effect and although the particular mechanism and reason for the synergistic effect of the flame retardant composition utilized in accordance with the present invention is not fully understood, it is considered that the results positively speak for themselves.

The metal phosphinate polymers of the present invention are provided by bridging metal cations with one or more phosphinate anions of the formula (RR'PO$_2$)$^-$ which are derived from phosphinic acids. Thus metal phosphinate polymers may differ in the number of phosphinate groups per coordination center and by the substituent attached to metals having a valence state greater than +2.

Generally, the presence of two or more phosphinate groups per center leads to extensive polymerization of the type preferred in the present invention.

The metal phosphinate polymers of the present invention may be illustrated by the following formulas

[M(OPRR'O)$_m$]n    (I)

[M'(B)$_z$(OPRR'O)$_m$]n    (II)

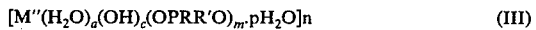

[M"(H$_2$O)$_a$(OH)$_c$(OPRR'O)$_m$·pH$_2$O]n    (III)

where M is a member selected from the group consisting of Co, Mn, Cr, Ni, Zn, Zr, Ti, and M' is a member selected from the group consisting of Ti and Zr; B is a member selected from the group consisting of oxo, alkoxy, and aryloxy, z equals 1 when B equals oxo and z equals 2 when B equals alkoxy and aryloxy and z equals 0 when m equals 3; M" is Cr(III); a+p = 1; q may vary from 1 to 3; m may vary from 1 to 3; c may vary from 0 to 3; and n is at least 10 (e.g., from about 10 to about 300).

As may be seen therefrom, the phosphinate bridges, i.e., (OPRR'O)$^-$ present in all three formulas may be derived from the same phosphinic acids. Thus, for all three formulas R and R' may be the same or different and may represent lower alkyl, alkaryl, aralkyl and aryl radicals. The alkyl radicals generally should not contain more than 12 carbon atoms while the aryl radicals may include phenyl, tolyl, p-alkoxy phenyl, p-aryloxy phenyl and the like; and, m may vary from 1 to 3 (e.g., from about 2 to 3).

It has been found inter-alia that the flame retardant properties of the metal phosphinate polymers utilizing aromatic substituents on the phosphinate bridge enhances the flame retardant properties of the resulting polymer over those polymers containing only alkyl groups attached to the phosphorus in the phosphinate bridge.

In addition it has been observed that polymers, wherein the R groups are short chain alkyl groups, have enhanced solubility in various solvents such as chloroform, tetrahydrofuran, DMF, dimethyl sulfoxide, dioxane, methylene chloride and benzene when utilized in spinning or extrusion operations over those polymers which utilize aromatic substituents bound to phosphorus metal in the phosphinate bridge. However, as the number and length of these alkyl groups increases the flame retardant properties of the resulting polymers begins to decrease.

In formulating the preferred metal phosphinate polymers, therefore, it is desired to optimize the properties of flame retardancy and solubility. This goal is easily achieved with certain metal phosphinate polymers, such as, the Ti and Cr di-aryl (e.g., di-phenyl) phosphinates which are readily soluble in the above described solvents. Certain other polymers such as those utilizing the Zn, Zr, Co, and Ni metals are insoluble or only slightly soluble in solvents of the type disclosed when the R groups are di-aryl. Accordingly, it is preferred in preparing polymers utilizing these metals to provide a partial substitution of short chain alkyl groups (e.g., up to 12 carbon atoms) to replace the preferred aryl groups thereby increasing the solubility of the resulting polymer. This may be achieved by formulating homopolymers wherein the R and R'; groups of the phosphinic acid utilized are alkyl and aryl respectively (e.g., R=methyl and R' = phenyl) or by formulating copolymers from a mixture of phosphinic acids which comprises from about 10 to about 90%, preferably from about 25 to about 75%, most preferably from about 40 to about 60% (e.g. 50%) phosphinic acids wherein R and R' are alkyl and correspondingly from about 90 to about 10%, preferably from about 75 to 25% most preferably from about 60 to about 40% (e.g. 50%) phosphinic acids wherein R and R' are aryl. Said mixture may also include from about 10% to about 100% preferably from about 50% to about 100%, most preferably from about 75% to about 100% mixed phosphinic acids wherein R = alkyl and R' = aryl.

Thus a number of the polymers of the present invention are tailored to achieve a balance between the properties of flame retardancy and solubility.

Representative examples of such alkyl radicals include methyl, ethyl, propyl, cyclohexyl, cyclopentyl, n-decyl, and dodecyl. Representative examples of aryl radicals include, phenyl, biphenyl, β-naphthyl, biphenyloxphenyl, and phenoxy phenyl.

Specific examples of phosphinic acids from which the phosphinate bridges may be derived include bis[4-(2-methyl phenoxy) phenyl] phosphinic acid, methyl (4-m-terphenylyl) phosphinic acid, bis(p-phenoxy-phenyl) phosphinic acid, bis benzyl phosphinic acid. Preferred phosphinic acids and their corresponding preferred metals include diphenylphosphinic acid for Ti and Cr; methyl phenyl phosphinic acid for Zn, Ti, Zr, Co; and di-n-butyl phosphinic acid for Zn, Ti, Zr.

Specific acid mixtures which exemplify those which may be used to provide copolymers as described above include diphenylphosphinic acid and phenylmethylphosphinic acid; dimethylphosphinic acid and diphenylphosphinic acid; diphenylphosphinic acid, dimethylphosphinic acid and phenylmethylphosphinic acid; dimethylphosphinic acid and diethylphosphinic acid; ethylphenylphosphinic acid and dimethylphosphinic acid; methyloctylphosphinic acid and ethylphenylphosphinic acid; and the like. The proportions of phosphinic acid entities in the mixtures which may be used are tailored so as to provide optimum properties of flame retardancy and flammability.

Spectral analysis indicates that formula I may be represented as compounds having a plurality of recurring units having structures which include those illustrated by formulas IV and V:

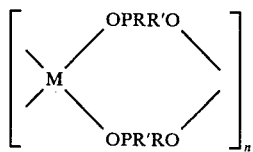 (IV)

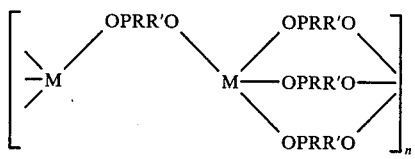 (V)

where M is a bivalent or trivalent metal capable of assuming a four-coordinate and/or six coordinate complex selected from the groups consisting of Co, Mn, Cr, Ni, Zn, Zr, and Ti and n may vary from about 10 to about 100.

Whether the polymer will assume the double bridge structure of formula (V) is believed to be dependent on the identity of R and R'. When R, R' comprise bridged alkyl groups such as found in a polymer with a zinc bis-(1-methyl-butyl) phosphinate backbone, such branched groups make the formation of the triple bridged cages difficult as a result of steric hinderances of these side chains. Thus, the structure of formula (V) is believed to occur when there are no steric restraints, while the structure of formula (IV) is believed to be the preferred configuration for bulky side chains such as phenyl or linear alkyl groups.

Spectral analysis indicates that specific examples of the polymers of formula I include those having the following recurring units where n is typically greater than 30.

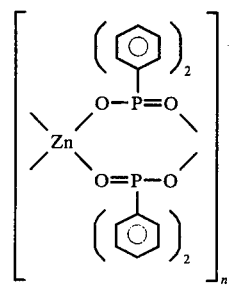 (VI)

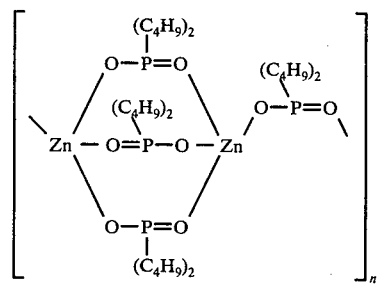 (VII)

The polymers of formula II may be represented as compounds having a plurality of recurring units having the structure

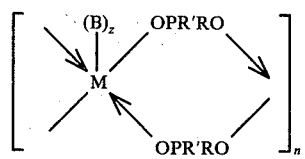 (VIII)

where M is selected from the group consisting of Ti and Zr and B is a member selected from the group consisting of oxo, alkoxy, and aryloxy, z equals 1 when B equals oxo and z equals 2 when B equals alkoxy and aryloxy and n is at least 10.

Representative examples of suitable alkoxy substituents include methoxy, propoxy, ethoxy and the like.

Representative examples of suitable aryloxy substituents include phenoxy, p-methylphenoxy, p-methoxyphenoxy and the like.

The polymers of formula III may be represented as compounds having primarily a plurality of recurring units having the structure

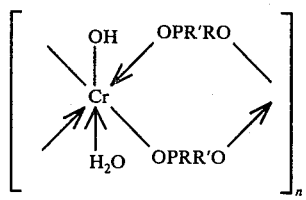 (IX)

where n may vary from about 10 to about 300.

However, spectral analysis indicates that the hydroxy aquo polymers may also contain small amounts of triply bridged monomer units such as illustrated by the following formulas:

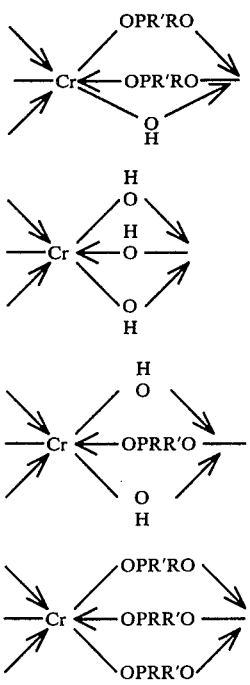

The polymers represented by formula III have been observed to undergo crosslinking when the R and R' groups are both dioctyl, or methyl and butyl respectively. Since excessive crosslinking is generally accompanied by an unacceptable decrease in solubility only linear polymers are within the scope of the present invention and crosslinking is to be avoided by utilizing R and R' groups such as phenyl which are not believed to result in crosslinking sufficient to render the polymers insoluble.

Thus the hydroxyaquo chromium III polymer may be characterized as having a multiplicity of repeating units the presence of some of which depends on the R and R' groups on the phosphinate bridge.

The chromium III metals may also form tris phosphinates where $m=3$ in fromula I and $n$ may vary from about 10 to about 300 which may be represented as polymers having a plurality of recurring units having the structure:

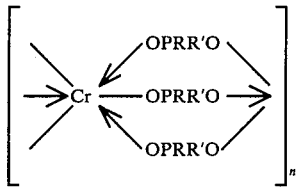

Here again crosslinking is sought to be avoided by tailoring the R groups to include methyl, butyl, octyl and phenyl.

An important factor to be considered in formulating the metal phosphinate polymers is the desired color of the resulting polymer and composition formed therefrom. The Zr and Ti yield white polymers and are therefore the most preferred. The other metals yield colored products and may be utilized where color is not a factor.

SYNTHESIS OF PHOSPHINIC ACID

The metal phosphinate polymers of the present invention generally require phosphinic acid or derivatives thereof as starting material.

Since the degree of polymerization obtained in a condensation reaction utilizing phosphinic acid can be adversely affected by small amounts of impurities care should be taken to prepare phosphinic acids in a high state of purity.

It has been observed that the purity of the acid can be improved by converting it to the phosphinyl chloride, (RR'P(O)Cl), with the use of thionyl chloride and then hydrolyzing a constant boiling fraction of the chloride with distilled water. The preparation of various phosphinic acids is described in the publications listed below.

PREPARATION OF PHOSPHINATE POLYMERS

The metal phosphinate polymers of the present invention may be prepared by a number of methods as described in the following articles which are herein incorporated by reference:

B. Block, *Polymeric Metal Phosphinates*, 1 Inorganic Macromolecules Reviews 115-125 (1970)

B. Block, S. Rose, C. Schaumann, E. Roth and J. Simkin, *Communications to the Editor: Coordination Polymers with Inorganic Backbones formed by Double Bridging of Tetrahedral Elements*, 84 J. Am. Chem. Soc. 3200-3201 (1962)

B. Block, S. Rose, C. Schaumann, E. Roth, J. Simkin, *Communications to the Editor: Poly-[Di-μ-Diphenylphosphinatoacetylacetonato Chromium (III)]. A Coordination polymer with an inorganic backbone;* 84 J. Am. Chem. Soc. 1749-1750 (1962)

P. Slota Jr., L. Freeman, and N. Fetter, *Metal Coordination Polymers I: Synthesis and Thermogravametric Analysis of Beryllium Phosphinate Polymers.* 6 J. of Pol. Sci. 1975-1990 (1968)

P. Nannelli, H. Gillman, B. Block, *Inorganic Coordination Polymers IX. A new family of Chromium (III) Bis(phosphinate) Polymers*, $[Cr(OH) (OPRR'O)_2]_x$ 9 J. of Pol. Sc. 3027-3038 (1971)

P. Nannelli, H. Gillman, *Inorganic Coordination Polymers (XIV) chromium (III) Phosphinate perfluorocarboxylate Polymers*, 12 J. of Pol. Sc. 221-229 (1974)

P. Nannelli, B. Block, J. King, A. Saraceno, O. Sprout Jr., N. Peschko, and G. Dahl, *Inorganic Coordination Polymers XII Chromium (III) Tris (phosphinates),* 11 J. of Pol. Sc. 2691-2701 (1973)

V. Grancotti, F. Giordano, A. Ripamonti, *A double-bridged Zinc (II) Bis-(1-methyl-butyl) phosphinate,* 154 Die Makromolekulare Chemie 271-277 (1972)

S. Rose, B. Block, *Inorganic Coordination Polymers VII: Zinc (II) dimethyl-, Methyl phenyl-, and Diphenylphosphinates,* 4 J. of Pol. Sc. 573-582 (1966)

P. Nannelli, H. Gillman, H. Monsimer, and S. Advani, *Inorganic Coordination Polymers XVI:Zinc II Phosphinate Polymers Containing Polyphenylene and poly(phenylene oxide) Side Groups,* 12 J. of Pol. Sc. 2525-2534 (1974)

H. Gillman, *Inorganic Coordination Polymers XV Dioctyl phosphinates of Chromium (II), Manganese (II), Iron (II) Nickel (II) and Copper (II),* 13 Inorganic Chemistry 1921-1924 (1974)

A. Saraceno, B. Block, *Inorganic Coordination Polymers VI: Linear Double-bridged Chromium (III) Phosphi-* nate Polymers with Inorganic Side Groups 3 Inorganic Chem. 1699–1703 (1964)

K. Maguire and B. Block, *Inorganic Coordination Polymers x: Observations on the formation and Nature of Poly(Diµ-diphenylphosphinate-hydroxyaquochromium (III), {Cr(H₂O) Cr(OH)-[OP(C₆H₅)₂O]₂}x*, 6, J. of Pol. Sc. 1397–1408 (1968)

G. Dahl, B. Block, *Inorganic Coordination Polymers IX: Titanium (IV) Phosphinate Polymers*, 6 Inorganic Chemistry 1439–1443 (1967)

S. Rose, B. Block, *Inorganic Coordination Polymers VIII Cobalt II and Zinc II Phosphinate Polymers and Copolymers* 4 J. of Pol. Sc. 583–592 (1966)

Thus many of the polymeric metal phosphinates have been made by metathetic reactions, either by fusion of the reactants or in solvents. Samples prepared from solution have as high degrees of polymerization as those prepared without solvents provided the stoichiometry is the same. Examples of the kinds of metathesis that have been employed may be illustrated by the following equations

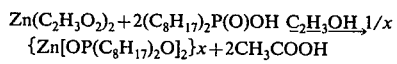

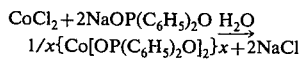

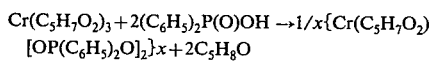

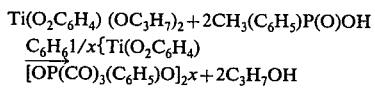

More specifically the metal phosphinate polymers of formula I may be prepared by reacting a phosphinic acid with a bivalent four coordinate metal acetylacetonate acetate, with or without a basic catalyst such as pyridine as described in U.S. Pat. Nos. 3,681,265 and 3,255,125 which are herein incorporated by reference. Alternatively an alcohol or a ketone (e.g., ethanol or acetone) solution may be used with the metal acetate. A still further method of preparation includes a direct fusion technique in which the reactants are heated until fusion occurs, and the product forms. Interfacial polymerization may also be utilized wherein a bivalent four coordinate metal salt is dissolved in one solvent and a reacting phosphinic acid compound is dissolved in a second solvent immiscible with the first. With vigorous mixing or high speed agitation of the two solutions, as in a high speed blender or disperser, reaction occurs at the interface of the solutions and the product solid which forms is separated by filtration, centrifugation or the like.

These reactions may be described as ligand exchange reactions.

Cobalt and manganese phosphinate polymers may be formed by the reduction of these metals from the trivalent state to the divalent state and then subjecting them to a ligand exchange reaction. This process is disclosed in U.S. Pat. No. 3,681,265 which is herein incorporated by reference. The bivalent manganese and cobalt compounds which may be utilized to prepare polymers of the invention include manganic and cobaltic acetates, carbonates, acetylacetones and the like. Manganic and cobaltic acetylacetonates are preferred because they are soluble in organic solvents, are easily purified, and are readily available.

Trivalent manganese and cobalt compounds and the phosphinic acids are reacted in a ratio of one mole of the former to at least two and preferably about three moles or more of the phosphinic acid. The reaction is affected at temperatures of from about 75° to 150° C. Accordingly, the reaction is conveniently carried out in solvents such as xylene, toluene, benzene, ethanol, pyridine and dioxane. The preferred solvents are xylene and xylene-ethanol mixtures. The reaction period may range from about two hours to about seventy-two hours. The solid polymer products are recovered from a reaction mixture by filtration or centrifuging and then purified by washing with suitable solvents.

The metal phosphinate polymers illustrated by formula II when B equals oxo may be prepared according to the process described in U.S. Pat. No. 3,457,195 which is herein incorporated by reference. Thus, titanium and zirconium chloride may be reacted with a phosphinic acid to obtain an adduct which is then heated to obtain an intermediate polymer. The intermediate polymer is subsequently hydrolyzed to yield the product polymer. The three steps of the process may be illustrated by the following equations:

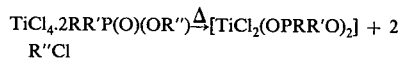

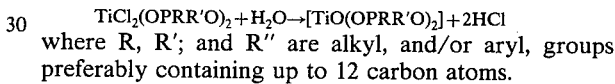

where R, R'; and R" are alkyl, and/or aryl, groups preferably containing up to 12 carbon atoms.

The metal phosphinate polymers illustrated by formula II wherein B equals aryloxy may be prepared according to the description found in U.S. Pat. No. 3,415,781 which is herein incorporated by reference. Thus a phosphinic acid having the formula R₁R₂P(O)(OH) wherein R₁ and R₂ are the same or different and are alkyl or aryl is reacted with a titanium chelate compound of the formula (RO)₂TiZ wherein R represents an alkyl group having one to four carbon atoms and Z is a bidentate ligand with a charge of −2 and comprises an aromatic anion obtained by the removal of active hydrogen atoms from hydroxyl groups attached to adjacent ring carbon atoms of a precursor which includes a six carbon atom aromatic ring or a ten carbon atom fused aromatic ring of an aromatic diol or aromatic hydroxy carboxylic acid, which aromatic rings can also be substituted in positions other than the adjacent hydroxy groups, or the adjacent hydroxy and carboxyl groups, with substituents selected from the class consisting of alkyl groups having one to four carbon atoms and the halogens, chlorine, fluorine and bromine. The reaction is desirably carried out in a solvent such as benzene, toluene, xylene, carbon tetrachloride, dichloroethane, tetrachloroethane or chloroform using a 1:2 molar ratio of the titanium chelate to the phosphinic acid. The reaction mixture is heated in the range of about 25° C. to 140° C. for a period of about one to ten hours. The product polymer is isolated by removal of the solvent by distillation.

The titanium chelate compound, (RO)₂TiZ, which is the starting material for the titanium phosphinate polymer is obtained by reacting a titanium alkoxide, i.e., Ti(OR)₄ where R is an alkyl group having one to four carbon atoms with a precursor of the bidentate ligand Z. Such reaction may be illustrated by the following equation:

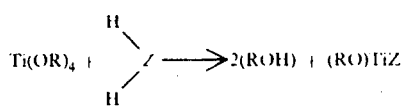

The reaction to produce the titanium chelate compound is carried out be reacting equimolar quantities of the precursor of the bidentate ligand and titanium alkoxide, preferably in the presence of a dry, inert solvent such as benzene, toluene, chloroform, or carbon tetrachloride. The reaction proceeds readily between 25° C. and 100° C. and is usually completed within one hour. It is desirable to carry out these reactions under nitrogen or some other inert gas to exclude moisture. After the reaction is complete, the desired product is obtained by crystallization of by removal of solvent by distillation.

The metal phosphinate polymers illustrated by formula II wherein B equals alkoxy may be prepared by reacting a titanium (IV) alkoxide with phosphinic oxide. See Dahl and Block, *Inorganic Coordination Polymers IX*, Supra.

Chromium II bisphosphinate polymers may be prepared according to the procedures disclosed in K. Maguire and B. Block, *Inorganic Coordination polymers X:Observations on the Formation and Nature of Poly (di-m-diphenylphosphinatic-hydroxyaquachromium -(III)*, $\{Cr\ (H_2O\text{OH}\ \text{-}[OP\ (C_6H_5)\ _2O]_2\}x$, 6 H. of Pol. Sc. 1397–1408 (1968) Thus, chromium bisphosphinates may be prepared by reacting a solution of $CrCl_2$ with a phosphinate at elevated temperature.

The chromium (III) hydroxyaquo bis(phosphinates) may be prepared by reacting a soluble chromium salt such as $CrCl_3.6H_2O$ or $Cr.(NO_3)_3.9H_2O$ with two equivalents of alkali metal phosphinate and one equivalent of alkali metal hydroxide or carbonate in a water-tetrahydrofuran medium. Such reaction may be summarized by the equation:

$2CrCl_3.6H_2O + 4NaOPRR'O$
$+ K_2CO_3 \rightarrow 2Cr(H_2O)(OH)(OPRR'O)_2 + NaCl$
$+ 2KCl. + CO_2 + 9H_2O$ Alternatively, the polymers can be prepared by the reaction of chromium (III) hydroxide with two equivalents of phosphini acids in the same solvent mixture.

The hydroxyaquochromium (III) tris phosphinates may be prepared in accordance with the method described in P. Nannelli, B. Block, J. King, A saraceno, D. Sprout Jr., N. Peschko, and G. Dahl, *Inorganic Coordination Polymers XII, Chromium (III) tris (phosphinates)*, 11 J. of Pol. Sc. 2691–2701 (1973). Thus, a polymeric chromium (III) trisphosphinate may be treated with a phosphinic acid in a 1:1 molar ratio at an elevated temperature in a solvent such as toluene, chloroform or THF.

It is to be understood that the above discussion of the various metal phosphinate polymers refers to both homopolymers and copolymers having double phosphinate bridges, triple phosphinate bridges, or alternating single and triple phosphinate bridges.

Copolymers are obtained in a manner similar to that for homopolymers except that the polymerization is carried out with a mixture of acids or polymer forming derivatives thereof.

Thus, for example, the metal described herein, may be reacted with two or more different acids, as for example, with phosphinic acid derivatives of the structure RR'P(O)(OH) wherein the acids used as reactants will have different R groups.

Generally the metal phosphinate polymerization reaction is conducted so as to obtain a metal phosphinate polymer having an intrinsic viscosity (I.V.) which may vary from about 0.1 to about 1 preferably from about 0.3 to about 1.0, most preferably from about 0.5 to about 1.0. The intrinsic viscosity is determined by measuring the relative viscosity of a 0.1% solution of the polymer at 25° C in a suitable solvent, such as a 10/7 (w/w) mixture of phenol trichlorohenol. The viscosity of the polymer solution is measured relative to the solvent alone and the intrinsic viscosity (I.V.) is determined from the following equation:

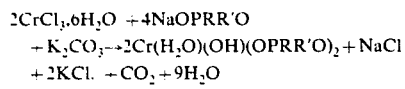

In the above formula, $V_2$ is the efflux time of the solution, $V_1$ is the efflux time of the solvent, and C is the concentration expressed in grams of polymer per hundred milliliters of solution. As is known in the polymer art, intrinsic viscosity is monotonically related to the molecular weight of the polymer.

Typically, the molecular weight of the metal phosphinate polymers may vary from about 3,000 to about 12,000 for those polymers defined by Formula I; from about 2,000 to about 10,000 for those polymers defined by Formula II; and from 8,000 to about 150,000 for the polymer defined by Formula III.

Useful techniques for measuring the molecular weights of the metal phosphinate polymers include ebulliometry and vapor pressure osmometry in benzene and chloroform. Procedures for such techniques may be found in F. Billmeyer, "Textbook of Polymer Science" 2nd ed. (1970) which is herein incorporated by reference.

The metal phosphinate polymers of the present invention possess high thermal stability as indicated by thermogravimetric analysis. The thermal stabilities are measured in both air and nitrogen and temperatures at which weight loss begins may vary from about 200° C. to about 450° C., preferably from about 300° C. to about 450° C., most preferably from about 350° C. to about 450° C.

The flame retarding agents described herein may be employed to reduce the flammability of synthetic chlorinated or brominated aromatic polymers having a chlorine and/or bromine content of about 5 to about 60% by weight based upon the weight of the aromatic polymers, (e.g., a chlorine and/or bromine content of about 10 to about 40% by weight). Such aromatic polymer is chlorinated and/or brominated in the sense that these substituent groups are directly attached to an aromatic ring. Particularly satisfactory results are achievable when the halogen substituents upon the aromatic ring are bromine.

Representative additive fibers for use in the present invention consist primarily of a chlorinated and/or brominated aromatic polyester of the recurring structural formula

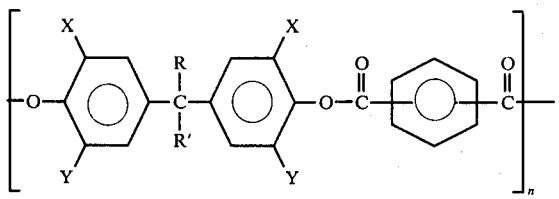

where X is chlorine or bromine, Y is hydrogen, chlorine or bromine, R and R' may be the same or different and represent lower alkyl groups (e.g., 1 to 5 carbon atoms) or hydrogen or together constitute a cyclic hydrocarbon group, and $n =$ at least 25, e.g., about 40 to 400. The end groups of the polymer illustrated in the formula commonly are

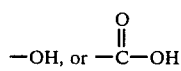

depending upon the synthesis route selected as will be apparent to those skilled in the art. Suitable methods for the manufacture of such aromatic polyesters are disclosed in U.S. Pat. Nos. 2,035,578 and 3,234,167. Australian Pat. No. 242,803, British Pat. No. 924,607, commonly assigned United States Patent No. 3,824,213 and Ser. No. 401,081 filed Sept. 26, 1973 (now abandoned), which are herein incorporated by reference. The chlorinated or brominated aromatic polyester may be formed by the condensation of tetrachlorobisphenol A (i.e., 4,4'-isopropylidene-2,2',6,6'-tetrachlorodiphenol) or tetrabromobisphenol A (i.e., 4,4'-isopropylidene-2,2',6,6'-tetrabromodiphenol) with isophthalic acid and/or terephthalic acid or the ester-forming derivatives thereof.

A preferred chlorinated aromatic polyester is formed by the condensation of tetrachlorobisphenol A (i.e., 4,4'-isopropylidene-2,2',6,6'-tetrachlorodiphenol) with an aromatic acid mixture of about 90 to 40% isophthalic acid (e.g., 80 to 60% by weight) and correspondingly about 10 to 60% by weight terephthalic acid (e.g., 20 to 40% by weight) or the ester-forming derivatives thereof. For instance, a lower carboxylic acid diester of a monocarboxylic acid possessing 2 to 5 carbon atoms and tetrachlorobisphenol A may be reacted with a mixture of terephthalic acid and isophthalic acid in the presence of an appropriate solvent and catalyst. A preferred brominated aromatic polyester is formed by the condensation of tetrabromobisphenol A (i.e., 4,4'-isopropylidene-2,2',6,6'-tetrabromodiphenol) with an aromatic acid mixture of about 45 to 75% by weight isophthalic acid and correspondingly about 55 to 25% by weight terephthalic acid or the ester-forming derivatives thereof. For instance, tetrabromobisphenol A may be reacted with a mixture of isophthaloyl chloride and terephthaloyl chloride in the presence of an appropriate solvent and catalyst to produce a polymer having —OH and

end groups.

Such polymers may be spun into fibers via dry spinning or wet spinning techniques and offer the additional advantage of exhibiting highly satisfactory physical properties following hot drawing which render the same amenable to textile application, e.g., they possess a good hand and aesthetic appeal.

Additional representative polymers for use in the present invention are polyamides, other polyesters, polycarbonates, and polyurethanes which contain chlorine, bromine, or mixtures thereof chemically bound to an aromatic ring. For instance, monomers such as 2,2',6,6'-tetrabromo-3,3',5,5'-tetramethyl-4,4'-dihydroxybiphenyl and the di(hydroxy ethoxy) ether thereof, tetrachlorobisphenol A, tetrabromobisphenol A, 2,5-dichloroterephthalic acid, 2,5-dibromoterephthalic acid, 2,3,5,7-tetrachlorophthalic acid, and 2,3,5,7-tetrabromoterephthalic acid, di(hydroxy ethoxy ether) of tetrachlorobisphenol A, diethoxylated 2,2-dichlorohydroquinones, diethoxylated 2,5-dibromohydroquinones, and 2,2,-bis[3,5-dibromo-4-(2-hydroxyethoxy)phenyl]propane etc., may supply the chlorine and/or bromine when incorporated in the polymer chain. Preferably those additive fibers are selected which do not substantially visually detract from the otherwise desirable properties of the blend when aesthetic considerations are of importance, and which have a melting point of at least 250° (e.g., a melting point from about 250° to about 300° C.).

Typically, the halogenated aromatic polymers described above are polymerized to the extent necessary to obtain an Intrinsic Viscosity which may vary from about 0.5 to about 2.0, preferably from about 0.8 to about 1.7, and most preferably from about 1.0 to about 1.5.

With respect to proportions, the amount of the metal phosphinate, additive which may be admixed with the synthetic halogenated aromatic polymer substrate will depend, primarily, upon such factors as the particular metal phosphinate additive and polymer substrate which are to be blended with one another, the degree of fire retardancy desired and the resulting blend, the degree of clarity, hardness and other specific properties which are sought, as well as other technical and economic considerations known and understood by those skilled in the art. Thus while any effective amount of the above-described fire retardant metal phosphinate polymer may be employed to reduce flammability, it is generally desirable that this effective amount constitute from about 5% to about 20%; preferably from about 5% to about 15%; most preferably from about 5% to about 12% (e.g., 10%) based on the total weight of the blend if the synthetic halogenated aromatic polymeric material hereinabove described and the linear polymeric metal phosphinate.

The actual blending of the metal phosphinate polymeric additives with the selected synthetic halogenated aromatic polymeric substrate, i.e., with any one or more of the above-described polymers, may be accomplished by means of any convenient procedure which will result in intimate admixture of the additives within the mass of the substrate halogenated aromatic polymer. Thus, for example, an aqueous suspension containing the particles of the metal phosphinate additive may simply be blended or otherwise admixed with the substrate polymer. Or, if desired, the metal phosphinate flame retardant additive and the halogenated aromatic polymer substrate may be admixed while each is in the form of a powder and thereafter formed into the desired product.

The blending operation may also be carried out by means of a procedure in which the halogenated aromatic polymer which comprises the substrate, is itself, polymerized while in the presence of an aqueous emulsion or suspension or organic solvent solution containing previously polymerized metal phosphinate polymer additive. Alternatively, the metal phosphinate additives may be polymerized in a system which contains the previously polymerized selected halogenated aromatic polymer substrate in an appropriate physical form, e.g., as an aqueous suspension or emulsion or in organic solvent solution.

In a preferred method of blending selected halogenated aromatic polymeric material and the metal phosphinate polymeric flame retardant additive may be dissolved in methylene chloride and solution spun into an evaporative atmosphere to form a filamentary material which may be, hot drawn, cut and provided in a variety of physical configurations. For instance, the fibrous material which serves as a starting material may be provided as fluff, sliver, yarns, tows, rovings, fibrids, filaments, etc. and may consist of staple or continuous fibers. If desired, the fibrous material may be present as a fiber assemblage, e.g., as a woven, non-woven, or knitted fabric and may be blended with other similarly prepared fibrous materials such as cotton, rayon, nylon, acetate, acrylics and the like.

The temperature at which the metal phosphinate polymer and the halogenated aromatic polymeric material are blended may vary depending upon the particular method of blending utilized, as would be obvious to one skilled in the art, provided the temperature does not exceed the point at which the organic material begins to degrade. Thus the polymeric metal phosphinates of the present invention are sufficiently stable to be used with the halogenated aromatic synthetic polymers which are processed at relatively high temperatures which may vary from about 250° C. to about 330° C., preferably from about 250° C. to about 300° C., most preferably from about 250° C. to about 280° C. Where melt blending is employed the temperature utilized must be above the melting point of the polymer and below the thermal degradation point. Thus blending temperatures for polyesters of the type described herein generally should not exceed 330° C.

The fire retardant compositions of the present invention may be prepared so as to contain various optional additives as would be obvious to one skilled in the art which may include plasticizers, lubricants, mold release agents, fillers, pigments, dyes, and opacifying agents, provided they do not detract from the flame retardancy of these products.

Blending of the above-described halogenated aromatic polymers with the disclosed metal phosphinate polymers typically results in a composition with reduced flammability as shown by the increased Limiting Oxygen Index (hereinafter referred to as LOI) in the examples. The LOI test employed herein was as follows: A test sample is prepared by dissolving the metal phosphinate additive-halogenated aromatic polymer mixture with methylene chloride at approximately 20% solids by tumbling the mixture overnight. A film is cast, dried, cut up, and ground to 60 mesh on a Wiley mill. The polymer/additive mixture is ground with 60 mesh 50/50 PET/cotton at levels of 20, 30, and 40%. Half gram samples are pressed into pellets and thin cross-sections ¼ inch wide and 10 mills thick are cut from the pellets for LOI determinations. The sample is suspended vertically in a chimney of the apparatus purged with a gas containing a known percentage of oxygen and then contacted on the bottom by vertical micro-oxygen flame 1/16 inch long and 1/32 inch in diameter at a temperature of about 1350° C. The torch is then withdrawn 1 second after ignition occurs, and the lowest oxygen level at which a sample continues to burn for the observable period, usually less than 1 second, is recorded as the Limiting Oxygen Index. If the burn is unobtainable the oxygen level is recorded and raised.

Novel polymer blends of this invention comprising blends of any of the above-described halogenated aromatic polymers with one or more of the linear metal phosphinate polymeric additives may be utilized in any of the coating, impregnating, and molding, and fiber spinning applications known to those skilled in the art where it is desirable to provide fire retardancy to the resulting end product. For example, these compositions may be used for preparing such diverse items as camera films, blow molded bottles, extruded and blown films, extruded and shaped articles such as handles, tubes, sheets, rods, fibers, particularly with polyester fibers and textiles based on these fibers. For instance, the fabrics, textiles, wool coverings, hospital cubical draperies, children's sleepwear, flight suits, slippers, upholstery, thread, apparel, etc. may be formed from the same.

The following examples are given as specific illustrations of the claimed invention. It should be understood, however, that the invention is not limited to the specific details set forth in the examples.

EXAMPLE I

Preparation of Brominated Aromatic Polymer Substrates

A halogenated aromatic polyester is prepared by condensing tetrabromobisphenol A with a 60:40 isophthalic:terephthalic acid chloride mixture. More specifically 201.7 parts by weight tetrabromobisphenol A, 46.05 parts by weight isophthaloyl chloride and 30.8 parts by weight of terephthaloyl chloride are reacted to form a brominated aromatic polyester in the presence of about 2600 parts by weight methylene chloride solvent and 82 parts by weight of triethylamine acid acceptor.

The contents of the reaction zone are heated at about 40° C. with agitation for three hours. When the reaction is complete triethylamine is extracted with a 3% hydrochloric acid solution and the reaction mixture is washed with water until a pH of 6 is achieved. The resulting brominated polyester which serves as the substance which is blended with metal phosphinate polymeric substituents in the following examples is recovered by precipitation with methanol. The brominated aromatic polyester has the appearance of a white, fibrous flake and possesses a structural formula heretofore illustrated where X and Y are bromine groups, R and R' methyl groups, and $n$ equals about 50. The brominated aromatic polyester has a bromine content of about 48% by weight, a melting point of about 265° C. and exhibits an inherent viscosity of about 0.75 deciliters per gram determined at a concentration of 0.1% by weight in a solvent which is a mixture of 10 parts by weight of phenol and 7 parts by weight trichlorophenol.

PREPARATION OF CONTROL

The polymer thus prepared is cast to form a film and ground to 60 mesh on a Wiley mill with a 50/50 polyethylene terephthalate/cotton mixture at levels of 20, 30, and 40%. The mixture so formed is pressed into pellets and thin cross-sections cut therefrom. These samples serve as a control for LOI determinations subsequently performed on the polymer/additive blends of the following examples.

PREPARATION OF TI PHOSPHINATE POLYMER

A titanium phosphinate of the recurring structural formula $$[TiO(OP(C_6H_5)_2O)_2]_n$$

where $n$ is at least 10 is prepared in accordance with the procedures set forth in U.S. Pat. No. 3,457,195. Thus a solution of 17.19 grams (0.091 mole) of freshly distilled titanium chloride ($TiCl_4$) in 150 milliliters of benzene is added to a stirred solution of 44.783 grams (0.182 mole) of ethyl diphenyl phosphinate in 200 milliliters of benzene. The yellow adduct is filtered off, washed with benzene and dried overnight in vacuo. This compound is heated with agitation to 160° to 175° C. at which temperature evolution of $C_2H_5Cl$ proceeds quite readily. Heating is continued in vacuo for about 20 hours at 180° C. to complete the reaction.

The intermediate polymer thus formed $[TiCl_2.(OP(C_6H_5)_2O)_2]$ is suspended in boiling water until no further liberation of chloride ions can be detected (10 hours).

PREPARATION OF BLEND TEST SAMPLES

The halogenated aromatic polyester prepared above by condensing tetrabromobisphenol A with a mixture of isophthalic and terephthalic acid is blended with the titanium phosphinate also prepared above to form two different mixtures having brominated aromatic polyester/additive ratios of 90:10 and 80:20 respectively. Each mixture is cast to a film and ground to 60 mesh on a Wiley mill with a 50/50 PET/cotton mixture at levels of 20, 30, and 40%. Half-gram samples are pressed into pellets and thin cross-sections are cut therefrom for LOI determinations. The resulting LOI values obtained are set out in chart form (see chart 1).

EXAMPLE II

Chromium hydroxyaquo biphenyl phosphinate of the recurring structural formula $$[Cr(H_2O)_a(OH)_c(OP(C_6H_5)_2O)_2 \cdot pH_2O]_n$$

where $n$ is at least 10, and $a+p$ is 1, and $c$ may vary from 0 to 3 is prepared by adding a solution of $NaOP(C_6H_5)_2O(4,80$ g., 0.0200 mole) and $K_2CO(0.69$ g., 0.0050 mole) in 50 ml of water with stirring to a solution of $CrCl_3 \cdot 6H_2O(2.66$ g., 0.100 mole) in 50 ml of THF (tetrahydrofuran). The reaction mixture is brought to boiling and the THF allowed to evaporate. An oily product separates and solidifies upon evaporation of the THF. After most of the THF has been removed, additional water (about 50 ml) is added, and the suspension is kept boiling until the precipitate can be easily ground with a spatula. The powdered solid is then collected on a filter, and thoroughly washed with water. Solutions of the compounds had intrinsic viscosities of about 0.04 dl/g which increased to about 0.4 dl/g on standing at 55° C. for a few days in a $CHCl_3$ solution.

The phosphinate polymer so prepared is blended and tested in accordance with the procedures outlined in Example I. The resulting LOI values are set out in chart form (chart 1).

EXAMPLE III

A zinc metal phosphinate of the recurring structural formula $$[Zn[OP(CH_3)(C_6H_5)O]_2]_n$$

where $n$ is at least 10 is prepared by adding 7.718 grams (0.035 mole) and finely divided $Zn(C_2H_3O_2)_2 \cdot 2H_2O$ to a solution of 11.088 grams (0.071 mole) of $P(CH_3)(C_6H_5)(O)(OH)$ in 600 milliliters of ethanol. The mixture is stirred for 2 hours at room temperature, the filtered and the precipitate washed twice with ethanol.

The zinc metal phosphinate thus prepared is blended and tested in accordance with the procedures outlined in Example I. The resulting LOI values are set forth in chart form (chart 1).

EXAMPLE IV

A zince metal phosphinate of the recurring structural formula $$[Zn[OP(C_4H_9)_2O]_2]_n$$

where $n$ is at least 10 is prepared by the addition of 7.718 grams (0.035 mole) of finely divided $Zn(C_2H_3O_2)_2 \cdot 2H_2O$ to a solution of 12.653 grams (0.071 mole) of $(C_4H_9)_2P(O)OH$ in 600 milliliters of ethanol. The mixture is stirred for 2 hours at room temperature and then filtered and the precipitate washed twice with ethanol.

The zinc metal phosphinate thus prepared is blended and tested in accordance with the procedures outlined in Example I. The resulting LOI values are set out in chart from (chart 1).

EXAMPLE V

A zirconium phosphinate of the recurring formula $$[ZrO[OP(CH_3)(C_6H_5)O]_2]_n$$

where $n$ is at least 10 is prepared in accordance with the procedure outlined in Example I for the preparation of titanium phosphinate except that a methyl phenyl phosphinic acid ester is utilized instead of a diphenyl phosphinic acid ester.

The zirconium phosphinate so prepared is tested in accordance with the procedures outlined in Example I. The resulting LOI values are set forth in chart form (chart 1).

COMPARATIVE EXAMPLE VI

To provide a basis for comparison with other flame retardant additives utilized in the prior art such as a polyphosphate, polyphosphazene and a polyphosphonate of the recurring structural formulas

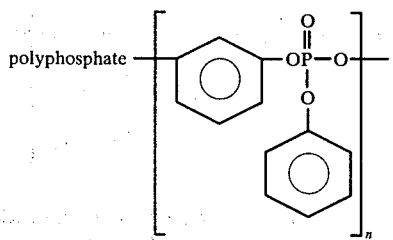

accordance with the procedures outlined in Example I. The resulting LOI values are set forth in chart form (chart 1).

Chart I

| Example No. | % Additive Blended with Control | LOI of Control/Additive Blended with 50/50 - PET/COT | | |
|---|---|---|---|---|
| | | 20% | 30% | 40% |
| (1) Control | | 18.2 | 20.8 | 23.1 |
| (1) [TiO(φ₂PO₂)₂]ₙ | 10 | 18.7 | 21.5 | 24.2 |
| (2) [Cr(OH)(O₂)(φ₂PO₂)₂]ₙ | 10 | 19.5 | 23.1 | 26.7 |
| | 10 | | | 23.7 |
| | 20 | | | 25.1 |
| (3) [Zn(φ—P(=O)(CH₃)—O)₂]ₙ | | | | |
| (4) [Zn[(C₄H₉)₂PO₂]₂]ₙ | 10 | | 22.6 | 25.6 |
| | 20 | | 22.8 | 25.4 |
| | 10 | | 23.2 | 26.0 |
| | 20 | | 24.2 | 26.3 |
| (5) [ZrO(φ—P(=O)(CH₃)—O)₂]ₙ | | | | |
| (6) a polyphosphate | 10 | 16.4 | 18.7 | 20.5 |
| (6) a polyphosphonate | 10 | 18.0 | 20.8 | 21.9 |
| (6) Sb₂O₃ | 2 | 19.4 | 21.0 | 25.5 |
| (6) Sb₂O₃ | 6 | 21.4 | 25.3 | 27.7 |
| (6) a polyphosphazene | 10 | 17.2 | 19.3 | 21.8 |
| (6) tris(2,3-dibromopropyl)phosphate | 10 | 19.1 | 20.4 | 22.9 |
| (6) triphenyl phosphate | 10 | 18.6 | 20.1 | 23.1 | polyphosphazene 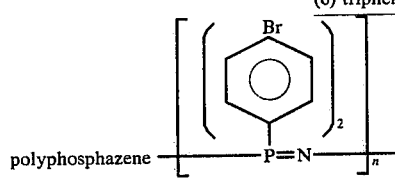

polyphosphonate where n is at least 5, 3 and 10 respectively, in addition to triphenylphosphate, tris (2,3-dibromo propyl) phosphate, and antimony oxide are prepared and tested in Although the invention has been described with preferred embodiments it is to be understood that variations and modifications may be employed without departing from the concept of the invention as defined in the following claims.

I claim:
1. A composition having flame retardant properties comprising
   A. a synthetic aromatic polymer containing chlorine, bromine, or mixtures thereof chemically bound to an aromatic ring and
   B. an amount sufficient to reduce the flammability of A up to about 20% by weight of A plus B of a linear polymeric metal phosphinate of the recur- ring structural formula selected from the group consisting of

  (I)

  (II)

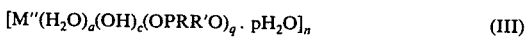  (III)

wherein R and R' may be the same or different and represent alkyl or aryl radicals, M is a metal selected from the group consisting of Co, Mn, Cr, Ni, Zn, Zr, Ti, and M' is a member selected from the group consisting of Ti and Zr; B is a member selected from the group consisting of oxo, alkoxy, aryloxy and $z$ equals 1 when B equals oxo, $z$ equals 2 when B equals alkoxy and aryloxy and $z$ equals 0 when $m$ equals 3; M'' is Cr(III); $a+p$ equals 1, $q$ may vary from 1 to 3, $c$ may vary from 0 to 3. $m$ may vary from 1 to 3, and $n$ is at least 10.

2. The composition according to claim 1 wherein the synthetic halogen containing aromatic polymer is selected from the group consisting of polyesters, polycarbonates, polyurethanes and polyamides.

3. The composition of claim 1 wherein said polymeric metal is present in an amount which may vary from about 5 to 20% by weight of A plus B.

4. A composition having flame retardant properties comprising
A. a halogenated aromatic polyester of the recurring structural formula

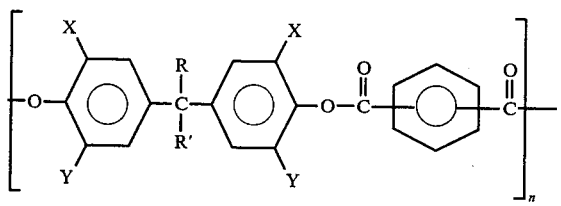

where X is chlorine or bromine, R and R' may be the same or different and represent lower alkyl groups, hydrogen, or together constitute a cyclic hydrocarbon group, $n =$ at least 25, with said aromatic polyester being a product of a tetrabromobisphenol and a mixture of 45 to 75 percent by weight of isophthalic acid or the ester forming derivatives thereof and correspondingly about 55 to 25 percent by weight of terephthalic acid or the ester forming derivatives thereof when X = Br, and with said halogenated polymer being a product of a tetrachlorobisphenol, and a mixture of 90 to 40 percent by weight isophthalic acid or the ester forming derivatives thereof and correspondingly about 10 to 60 percent by weight terephthalic acid or ester forming derivatives thereof when X = Cl, and
B. an amount sufficient to reduce the flammability of A up to about 20% by weight of A plus B of a linear polymeric metal phosphinate of the recurring structural formula selected from the group consisting of

  (I)

  (II)

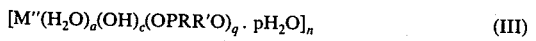  (III)

wherein R and R' may be the same or different and represent alkyl or aryl radicals, M is a metal selected from the group consisting of Co, Mn, Cr, Ni, Zn, Zr, Ti, and M' is a member selected from the group consisting of Ti and Zr; B is a member selected from the group consisting of oxo, alkoxy, aryloxy and $z$ equals 1 when B equals oxo, $z$ equals 2 when B equals alkoxy and aryloxy and $z$ equals 0 when $m$ equals 3; M'' is Cr(III); and $a+p$ equals 1; $m$ may vary from 1 to 3; $q$ may vary from 1 to 3; $c$ may vary from 0 to 3 and $n$ is at least 10.

5. The composition according to claim 4 wherein said halogenated aromatic polyester of the recurring structural formula is a product of a tetrabromobisphenol and a mixture of about 45 to 75% by weight isophthalic acid or the ester forming derivatives thereof, and correspondingly about 55 to 45% by weight terephthalic acid or the ester forming derivatives thereof.

6. The composition according to claim 4 wherein said halogenated aromatic polyester of the recurring structural formula is a product of tetrabromobisphenol A and the mixture of about 60% by weight isophthaloyl chloride and correspondingly about 40% by weight terephthaloyl chloride.

7. The composition according to claim 4 wherein said polymeric metal phosphinate is present in an amount which may vary from about 5 to 20% by weight of A plus B.

8. The composition according to claim 4 wherein X equals chlorine and said halogenated aromatic polyester of the recurring structural formula is a product of a tetrachlorobisphenol and a mixture of 80 to 60% by weight isophthalic acid or the ester forming derivatives thereof and correspondingly about 20 to 40% by weight of terephthalic acid or the ester forming derivatives thereof.

9. The composition according to claim 4 wherein said halogenated aromatic polyester of the recurring structural formula is a product of tetrachlorobisphenol A and a mixture of about 70% by weight of isophthaloyl chloride and correspondingly about 30% by weight terephthaloyl chloride.

10. The composition according to claim 4 wherein the metal of the polymeric metal phosphinate of the recurring structural formulas is titanium.

11. The composition according to claim 4 wherein the metal of said polymeric metal phosphinate of the recurring structural formula is zirconium.

12. A process for providing a composition having flame retardant properties comprising:
blending
A. a halogenated aromatic polyester of the recurring structural formula

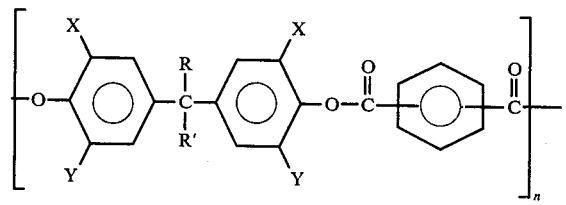

where X is chlorine or bromine, R and R' may be the same or different and represent lower alkyl groups, hydrogen, or together constitute a cyclic hydrocarbon group, $n =$ at least 25, with said aromatic polyester being a product of a tetrabromobisphenol and a mixture of 45 to 75 percent by weight of isophthalic acid or the ester forming derivatives thereof and correspondingly about 55 to 25 percent by weight of terephthalic acid or the ester forming derivatives thereof when X = Br, and with said halogenated polymer being a product of a tetrachlorobisphenol, and a mixture of 90 to 40 percent by weight isophthalic acid or the ester forming derivatives thereof and correspondingly about 10 to 60 percent by weight terephthalic acid or ester forming derivatives thereof when X = Cl, with;

B. an amount sufficient to reduce the flammability of A up to about 20% by weight of A plus B of a polymeric metal phosphinate of the recurring structural formula selected from the group consisting of $$[M(OPRR'O)_m]_n \qquad (I)$$

$$[M'(B)_z(OPRR'O)_m]_n \qquad (II)$$

$$[M''(H_2O)_a(OH)_c(OPRR'O)_q \cdot pH_2O]_n \qquad (III)$$

wherein R and R' may be the same or different and represent alkyl or aryl radicals, M is a metal selected from the group consisting of Co, Mn, Cr, Ni, Zn, Zr, Ti, M' is a member selected from the group consisting of Ti and Zr; B is a member selected from the group consisting of oxo, alkoxy, and aryloxy, $z$ equals 1 when B equals oxo and $z$ equals 2 when B equals alkoxy and aryloxy; $z$ equals 0 when $m$ equals 3; M'' is Cr(III); $a+p$ equals 1; $q$ may vary from 1 to 3; $m$ may vary from 1 to 3, $c$ may vary from 0 to 3 and $n$ is at least 10.

13. The process according to claim 12 wherein the metal of the polymeric metal phosphinate is selected from the group consisting of titanium and zirconium.

14. The process according to claim 12 wherein R is phenyl, and R' is methyl.

15. The process according to claim 12 wherein X equals bromine, and said halogenated aromatic polyester of the recurring structural formula is a product of a tetrabromobisphenol and a mixture of about 45 to 75% by weight isophthalic acid or the ester derivatives thereof and correspondingly about 55 to 25% by weight terephthalic acid of the ester forming derivatives thereof.

16. The process according to claim 12 wherein said halogenated aromatic polyester of the recurring structural formula is a product of tetrabromobisphenol A and a mixture of about 60% by weight isophthaloyl chloride and correspondingly about 40% by weight terephthaloyl chloride.

17. The process according to claim 12 wherein X equals chlorine and said halogenated fibrous material of the recurring structural formula is a product of a tetrachlorobisphenol and a mixture of 80 to 60% by weight isophthalic acid or the ester forming derivatives thereof and correspondingly about 20 to 40% by weight of terephthalic acid of the ester forming derivatives thereof.

18. The process according to claim 12 wherein said halogenated aromatic polyester of the recurring structural formula is a product of tetrachlorobisphenol A and a mixture of about 70% by weight isophthaloyl chloride correspondingly about 30% by weight terephthaloyl chloride.

19. The process according to claim 12 wherein the amount of polymeric metal phosphinate which is blended with the halogenated aromatic polyester may vary from about 5 to about 20% by weight of the blend.

20. A composition having flame retardant properties comprising

A. a halogenated aromatic polyester of the recurring structural formula

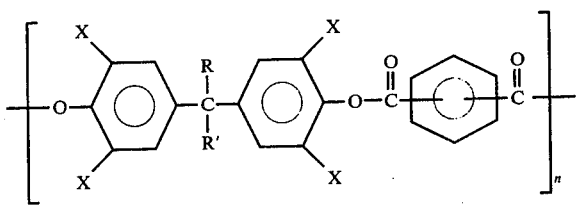

where X is bromine, R and R' may be the same or different and represent lower alkyl groups, hydrogen, or together constitute a cyclic hydrocarbon group, $n$ = at least 25, with said aromatic polyester being a product of tetrabromobisphenol A and a mixture of 45 to 75% by weight isophthalic acid or the ester forming derivatives thereof and correspondingly about 55 to 25 percent by weight of terephthalic acid or the ester forming derivatives thereof; and B. an amount sufficient to reduce the flammability of A up to about 20% by weight of A plus B of a linear polymeric metal phosphinate of the recurring structural formula selected from the group consisting of $$[M(OPRR'O)_m]_n \qquad (I)$$

$$[M'(B)_z(OPRR'O)_m]_n \qquad (II)$$

wherein R and R' may be the same or different and represent alkyl or aryl radicals, M is a metal selected from the group consisting of Co, Cr, Ni, Zn, Zr, Ti, and M' is a member selected from the group consisting of Ti and Zr; B is a member selected from the group consisting of oxo, alkoxy, aryloxy and $z$ equals 1 when B equals oxo, $z$ equals 2 when B equals alkoxy and aryloxy and $z$ equals 0 when $m$ equals 3; $m$ may vary from 1 to 3; and $n$ is at least 10.

21. The composition according to claim 20 wherein said halogenated aromatic polyester of the recurring structural formula is a product of tetrabromobisphenol A and a mixture of about 60% by weight isophthaloyl chloride and correspondingly about 40% by weight terephthaloyl chloride.

22. The composition according to claim 20 wherein said polymeric metal phosphinate is present in an amount which may vary from about 5 to 20% by weight of A plus B.

23. The composition according to claim 20 wherein the metal of the polymeric metal phosphinate of the recurring structural formula is titanium.

24. The composition according to claim 20 wherein the metal of said polymeric metal phosphinate of the recurring structural formula is zirconium.

25. A process for providing a composition having flame retardant properties comprising:
blending
A. a halogenated aromatic polyester of the recurring structural formula

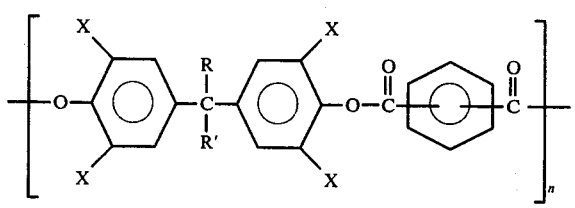

where X is bromine, R and R' may be the same or different and represent lower alkyl groups, hydrogen, or together constitute a cyclic hydrocarbon group, $n = $ at least 25, with said aromatic polyester being a product of tetrabromobisphenol A and a mixture of 45 to 75 percent by weight of isophthalic acid or the ester forming derivatives thereof and correspondingly about 55 to 25 percent by weight of terephthalic acid or the ester forming derivatives thereof, with;

B. an amount sufficient to reduce the flammability of A up to about 20% by weight of A plus B of a polymeric metal phosphinate of the recurring structural formula selected from the group consisting of $$[M(OPRR'O)_m]_n \quad \text{(I)}$$

$$[M'(B)_z(OPRR'O)_m]_n \quad \text{(II)}$$

wherein R and R' may be the same or different and represent alkyl or aryl radicals, M is a metal selected from the group consisting of Co, Mn, Cr, Ni, Zn, Zr, Ti, M' is a member selected from the group consisting of Ti and Zr; B is a member selected from the group consisting of oxo, alkoxy, and aryloxy, z equals 1 when B equals oxo and z equals 2 when B equals alkoxy and aryloxy; z equals 0 when m equals 3; m may vary from 1 to 3; and n is at least 10.

26. The process according to claim 25 wherein the metal of the polymeric metal phosphinate is a member selected from the group consisting of titanium and zirconium.

27. The process according to claim 25 wherein R is phenyl, and R' is methyl.

28. The process according to claim 25 wherein said halogenated aromatic polyester of the recurring structural formula is a product of tetrabromobisphenol A and a mixture of about 60% by weight isophthaloyl chloride and correspondingly about 40% by weight terephthaloyl chloride.

29. The process according to claim 25 wherein the amount of polymeric metal phosphinate which is blended with the halogenated aromatic polyester may vary from about 5 to about 20% by weight of the blend of A plus B.

* * * * *